United States Patent
Vijithakumara

(10) Patent No.: US 11,414,031 B2
(45) Date of Patent: Aug. 16, 2022

(54) EXTENDING CHARGING AVAILABILITY AFTER VEHICLE IGNITION OFF

(71) Applicant: Toyota Motor North America, Inc., Plano, TX (US)

(72) Inventor: Evan Vijithakumara, Frisco, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 353 days.

(21) Appl. No.: 16/707,320

(22) Filed: Dec. 9, 2019

(65) Prior Publication Data

US 2021/0170964 A1    Jun. 10, 2021

(51) Int. Cl.
| | | |
|---|---|---|
| *B60R 16/033* | (2006.01) | |
| *F02P 15/00* | (2006.01) | |
| *B60W 10/30* | (2006.01) | |

(52) U.S. Cl.
CPC ........... *B60R 16/033* (2013.01); *B60W 10/30* (2013.01); *F02P 15/006* (2013.01); *B60W 2510/244* (2013.01); *B60W 2540/06* (2013.01); *B60W 2710/244* (2013.01)

(58) Field of Classification Search
CPC ................ B60R 16/033; B60W 10/30; B60W 2510/244; B60W 2540/06; B60W 2710/244; F02P 15/006
USPC .............................................. 307/10.1, 10.6
See application file for complete search history.

(56) References Cited

U.S. PATENT DOCUMENTS

| | | | |
|---|---|---|---|
| 9,160,182 B2 | 10/2015 | Keating et al. | |
| 10,279,690 B2 | 5/2019 | Ferris | |
| 2015/0116121 A1 | 4/2015 | Hur et al. | |
| 2015/0149034 A1* | 5/2015 | Nordstrom | H02J 7/00 701/36 |
| 2016/0221441 A1* | 8/2016 | Hall | H02J 50/502 |
| 2018/0043846 A1* | 2/2018 | Salter | H01R 24/62 |

FOREIGN PATENT DOCUMENTS

| | | |
|---|---|---|
| CN | 107707735 A | 2/2018 |
| KR | 20180058958 A | 6/2018 |

* cited by examiner

*Primary Examiner* — Michael R. Fin
(74) *Attorney, Agent, or Firm* — Dinsmore & Shohl LLP

(57) ABSTRACT

A system includes an ignition switch, a power source, a power outlet, and an electronic control unit communicatively coupled to the ignition switch. The electronic control unit is configured to: determine that the ignition switch is set to an OFF state, determine whether a state of charge of an electronic device coupled to the power outlet is below a target state of charge, and in response to determining that the ignition switch is set to the OFF state and determining that the state of charge is below the target state of charge, provide power to the electronic device, from the power source and through the power outlet, while the ignition switch is set to the OFF state until the state of charge of the electronic device reaches the target state of charge.

15 Claims, 3 Drawing Sheets

EXTENDING CHARGING AVAILABILITY AFTER VEHICLE IGNITION OFF

TECHNICAL FIELD

The present specification generally relates to vehicle power systems and electronic device charging. More specifically, the systems and methods of the present specification facilitate powering an electronic device when the vehicle engine is OFF.

BACKGROUND

Vehicles include power outlets for providing power to personal devices, such as cellular phones, tablets, laptops, DVD players, personal gaming devices, and the like. Vehicle power outlets are generally driven by a battery. This battery is connected when an ignition switch activates the electrical power system of the vehicle and/or the engine of the vehicle is turned ON. Otherwise, the battery is only connected to vital monitoring systems, such as a vehicle security system, to prevent the battery in the vehicle from draining to a state of charge where it is unable to start the vehicle engine. Moreover, vehicles provide an excellent source of power for electronic devices during the vehicle owner's day as she travels from place to place. However, a vehicle owner may wish to leave an electronic device in a vehicle so that it may continue to charge without leaving the keys in the vehicle or running the engine.

Accordingly, there is a need for systems and methods for controlling the power system of a vehicle when the vehicle is turned OFF.

SUMMARY

In one embodiment, a system includes an ignition switch, a power source, a power outlet, and an electronic control unit communicatively coupled to the ignition switch. The electronic control unit is configured to: determine that the ignition switch is set to an OFF state, determine whether a state of charge of an electronic device coupled to the power outlet is below a target state of charge, and in response to determining that the ignition switch is set to the OFF state and determining that the state of charge is below the target state of charge, provide power to the electronic device, from the power source and through the power outlet, while the ignition switch is set to the OFF state until the state of charge of the electronic device reaches the target state of charge.

In some embodiments, a method includes determining that an ignition switch is set to an OFF state, determining whether a state of charge of an electronic device coupled to a power outlet is below a target state of charge, and in response to determining that the ignition switch is set to the OFF state and determining that the state of charge is below the target state of charge, providing power to the electronic device, from a power source and through the power outlet, while the ignition switch is set to the OFF state until the state of charge of the electronic device reaches the target state of charge.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein relate to systems and methods for controlling power delivered to a power outlet in a vehicle. The systems and methods of the present specification facilitate powering an electronic device when the vehicle engine is OFF. Embodiments include a system that interfaces with an electronic device to be charged to determine how long a vehicle power outlet (also referred to herein as a charging port) should stay active after the vehicle ignition is switched OFF. The interface enables a vehicle to exchange information with a device to be charged. The information may include a remaining required charge time to charge the device, a desired charge level the device should achieve, a current state of charge of the device, or the like, so that the system may determine how long to keep the power outlet active and/or when to terminate power to the power outlet after the vehicle ignition is switched OFF.

The vehicle includes a battery selectively coupled to a power outlet such as a cigarette lighter adapter ("CLA"), a wireless charger, a wired charger, a USB outlet, an AC outlet or the like. The selective electric coupling of the battery to the power outlet enables and disables the power outlet from providing power to a connected (e.g., a wired or wirelessly coupled) electronic device.

In some embodiments, the present concept may allow a vehicle's wireless charging functionality to remain available after the ignition is switched OFF. In some embodiments, the vehicle may provide a notification asking the user if wireless charging should remain available after ignition is switched OFF, and if so, for how long. In an example embodiment, the system may automatically negotiate the extended availability of charging between a vehicle computing system and the device being charged. For example, if a phone needs 15 additional minutes after the ignition of the vehicle is turned OFF to achieve a desired charge level, then the phone may communicate this to the vehicle and the vehicle may approve the request. The vehicle may be configured to determine whether the vehicle battery has sufficient charge to continue outputting charging power when determining whether to approve the request to remain ON after the ignition of the vehicle is turned OFF.

Systems and methods for controlling power delivered to a power outlet in a vehicle such that power is selectively provided when the vehicle ignition is OFF will now be described in more detail with reference to the drawings and where like numbers refer to like structures.

Figure 1:
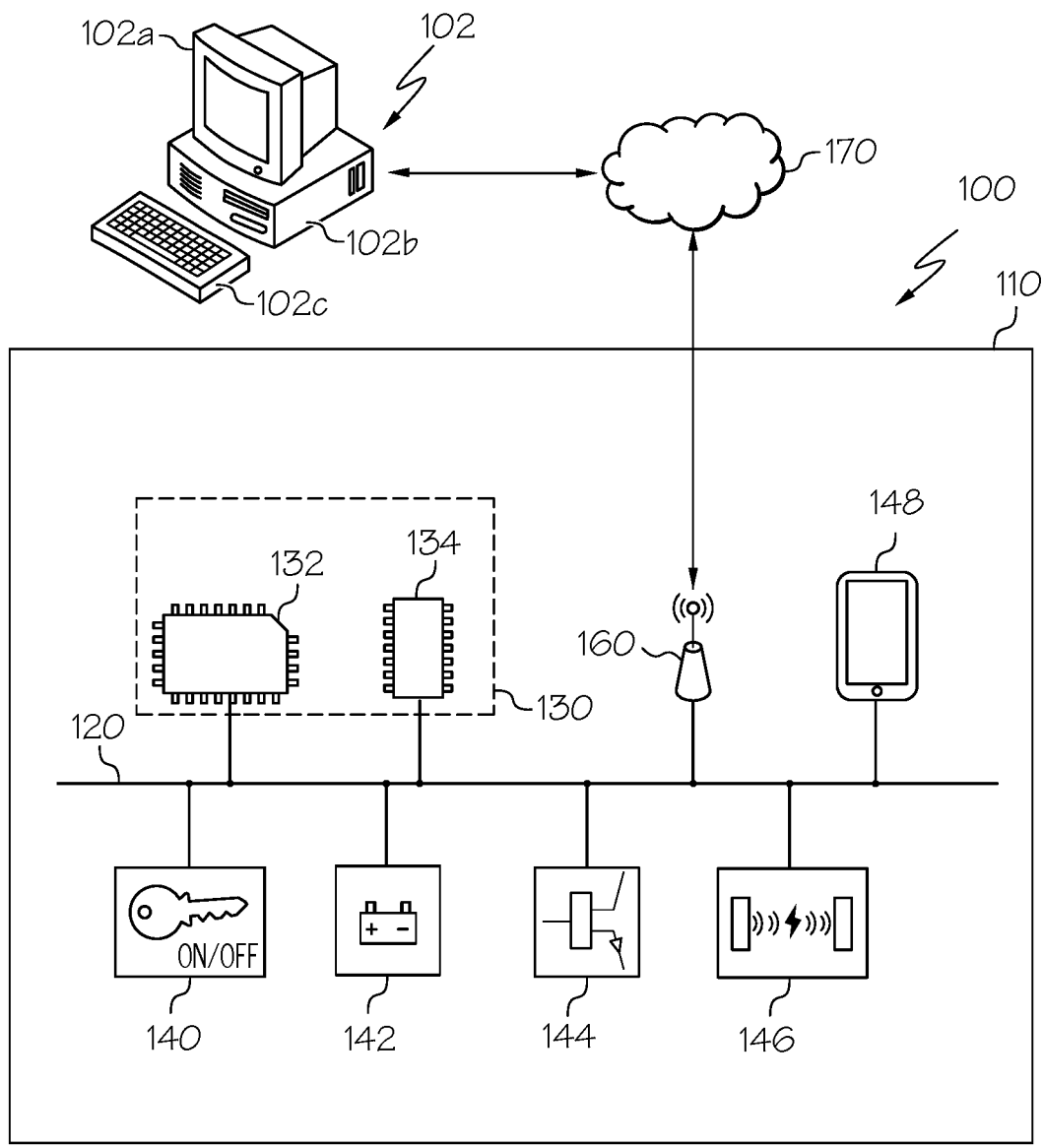
FIG. 1 schematically depicts components of a system for controlling power delivered to a power outlet of a vehicle according to one or more embodiments shown and described herein.

FIG. 1 schematically depicts components of a system 100 for controlling power delivered to a power outlet 146 in a vehicle 110. The system 100 may be implemented in a vehicle 110 as a part of a power system of the vehicle. The system 100 for controlling power delivered to a power outlet 146 in a vehicle 110 includes, a communication path 120, an electronic control unit 130 having a processor 132 and a non-transitory computer readable memory 134, an ignition switch 140, a power source 142, an electronic switch 144, a power outlet 146, an electronic device 148, and network interface hardware 160. The system 100 may be communicatively coupled to a network 170 by way of the network interface hardware 160. The components of the system 100 are contained within or mounted to a vehicle 110. The various components of the system 100 and the interaction thereof will be described in detail below.

The network 170 may operate to connect the system 100 with one or more computing devices 102. The computing device 102 may include a display 102a, a processing unit 102b and an input device 102c, each of which may be communicatively coupled to together and/or to the network 170. The computing device 102 may be utilized to configure the system 100.

Referring to the system 100, the communication path 120 may be formed from any medium that is capable of transmitting a signal such as, for example, conductive wires, conductive traces, optical waveguides, or the like. The communication path 120 may also refer to the expanse in which electromagnetic radiation and their corresponding electromagnetic waves traverses. Moreover, the communication path 120 may be formed from a combination of mediums capable of transmitting signals. In one embodiment, the communication path 120 comprises a combination of conductive traces, conductive wires, connectors, and buses that cooperate to permit the transmission of electrical data signals to components such as processors, memories, sensors, input devices, output devices, and communication devices. Accordingly, the communication path 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 120 communicatively couples the various components of the system 100. As used herein, the term "communicatively coupled" means that coupled components are capable of exchanging signals with one another such as, for example, electrical signals via conductive medium, electromagnetic signals via air, optical signals via optical waveguides, and the like.

The electronic control unit 130 may be any device or combination of components comprising a processor 132 and non-transitory computer readable memory 134. The processor 132 of the system 100 may be any device capable of executing the machine-readable instruction set stored in the non-transitory computer readable memory 134. Accordingly, the processor 132 may be an electric controller, an integrated circuit, a microchip, a computer, or any other computing device. The processor 132 is communicatively coupled to the other components of the system 100 by the communication path 120. Accordingly, the communication path 120 may communicatively couple any number of processors 132 with one another, and allow the components coupled to the communication path 120 to operate in a distributed computing environment. Specifically, each of the components may operate as a node that may send and/or receive data. While the embodiment depicted in FIG. 1 includes a single processor 132, other embodiments may include more than one processor 132.

The non-transitory computer readable memory 134 of the system 100 is coupled to the communication path 120 and communicatively coupled to the processor 132. The non-transitory computer readable memory 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 1 includes a single non-transitory computer readable memory 134, other embodiments may include more than one memory module.

The system 100 includes an ignition switch 140. The ignition switch 140 may be any device capable of turning a vehicle ON or OFF. In some embodiments, the ignition switch 140 is a keyed switch, a keyless switch, a wireless switch, a push button, or the like. When communicatively coupled to the electronic control unit 130, the ignition switch 140 generates a signal indicating the state in which the ignition switch 140 is set. The ignition switch 140 may have two or more set positions. For example, but without limitation the ignition switch 140 may have an OFF position, a START position, an ON position, or others. The OFF position, for example, corresponds to turning the vehicle engine OFF, the START position corresponds to the action of turning ON the vehicle engine, and the ON position corresponds to the running state of the vehicle.

The system 100 also includes a power source 142. The power source 142 may be a vehicle battery or other energy storage device. The power source 142 may be electrically coupled to one or more components of the system 100 and/or vehicle 110 such that power (e.g., voltage and current) can be provided to the one or more components of the system 100. The power source 142 may have a finite amount of energy stored therein. The energy may be replenished when the power source 142 is charged. The power source 142 may be electrically coupled to a power outlet 146. An electronic switch 144 may be positioned in line with the power source 142 and the power outlet 146 to control whether or not power is delivered from the power source 142 to the power outlet 146. The electronic switch 144 may further be communicatively coupled to the electronic control unit 130 whereby a control signal generated by the electronic control unit 130 activates or deactivates the electronic switch 144. The electronic switch 144 may be a relay, a transistor, a motorized rotary switch, or the like. The electronic switch 144 may be any type of switch having at least two states that are electrically transitioned between by way of a control signal. The two states include at least a high resistive state (e.g., a non-conducting state) and a low resistive state (e.g., a conducting state).

The power outlet 146 of the system may be any interface or device capable of transmitting electrical power to an electronic device 148 connected thereto. The electrical power may be transmitted wirelessly or via wires. That is, the power outlet 146 may be a wired interface such as an AC receptacle, a USB port, a DC jack, a cigarette lighter adaptor (CLA), or the like. In some embodiments, the power outlet 146 may be a wireless energy transmission coil (e.g., a wireless charger) configured to transform electrical power into wireless energy that may be received by a receiving coil and utilized by the device having the receiving coil. In embodiments described herein, the power outlet 146 may a charging interface configured to charge an electronic device 148 when the electronic device 148 is in wireless power transmission range and/or electrically coupled to the power outlet 146.

The electronic device 148 may be any device having a battery as a power source which requires recharging from time to time. The electronic device 148 may be a cellular phone, laptop, tablet, gaming device, DVD player, camera, portable power supply, or the like. The electronic device 148 may include a power port for receiving power, a communication port and/or a wireless communications adaptor for communicating with external devices, a wireless power receiving coil for receiving wireless power and converting the wireless power into electric current for storage in a battery.

Still referring to FIG. 1, the system 100 includes network interface hardware 160 coupled to the communication path 120 and communicatively coupled to the electronic control unit 130. The network interface hardware 160 may be any device capable of transmitting and/or receiving data via a network 170. Accordingly, network interface hardware 160 can include a communication transceiver for sending and/or receiving any wired or wireless communication. For example, the network interface hardware 160 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 160 includes hardware configured to operate in accordance with the Bluetooth wireless communication protocol. In another embodiment, network interface hardware 160 may include a Bluetooth send/receive module for sending and receiving Bluetooth communications to/from a network 170. The network interface hardware 160 may also include a radio frequency identification ("RFID") reader configured to interrogate and read RFID tags.

In some embodiments, the system 100 may be communicatively coupled to nearby vehicles via the network 170. In some embodiments, the network 170 is a personal area network that utilizes Bluetooth technology to communicatively couple the system 100 and the nearby vehicles. In other embodiments, the network 170 may include one or more computer networks (e.g., a personal area network, a local area network, or a wide area network), cellular networks, satellite networks and/or a global positioning system and combinations thereof. Accordingly, the system 100 can be communicatively coupled to the network 170 via wires, via a wide area network, via a local area network, via a personal area network, via a cellular network, via a satellite network, or the like. Suitable local area networks may include wired Ethernet and/or wireless technologies such as, for example, Wi-Fi. Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

The following sections will now describe embodiments of the operation of the system 100 for controlling power delivered to a power outlet 146 in a vehicle 110.

Figure 2:
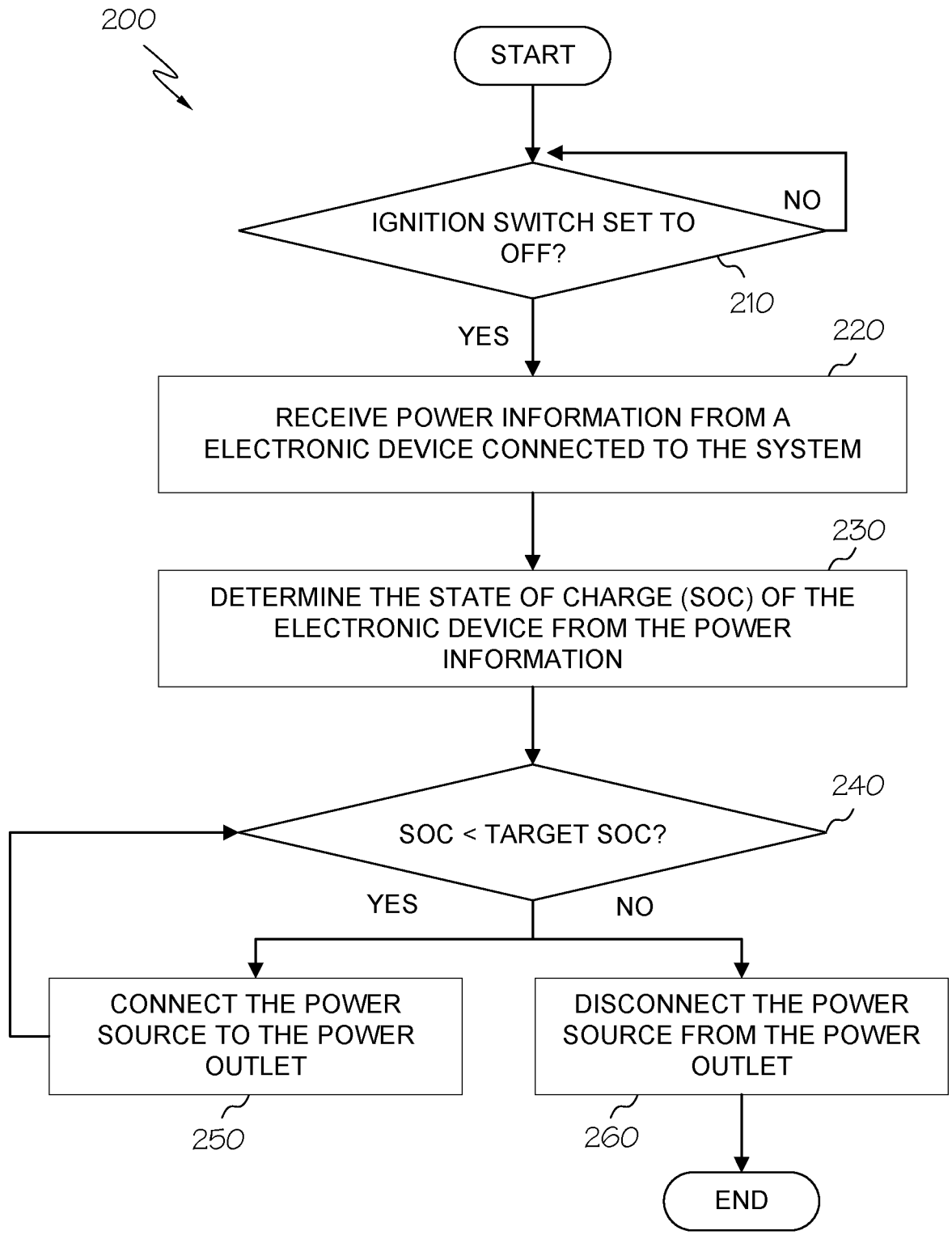
FIG. 2 depicts an illustrative method for controlling power delivered to a power outlet of a vehicle when the vehicle is in the OFF state according to one or more embodiments shown and described herein.
Figure 3:
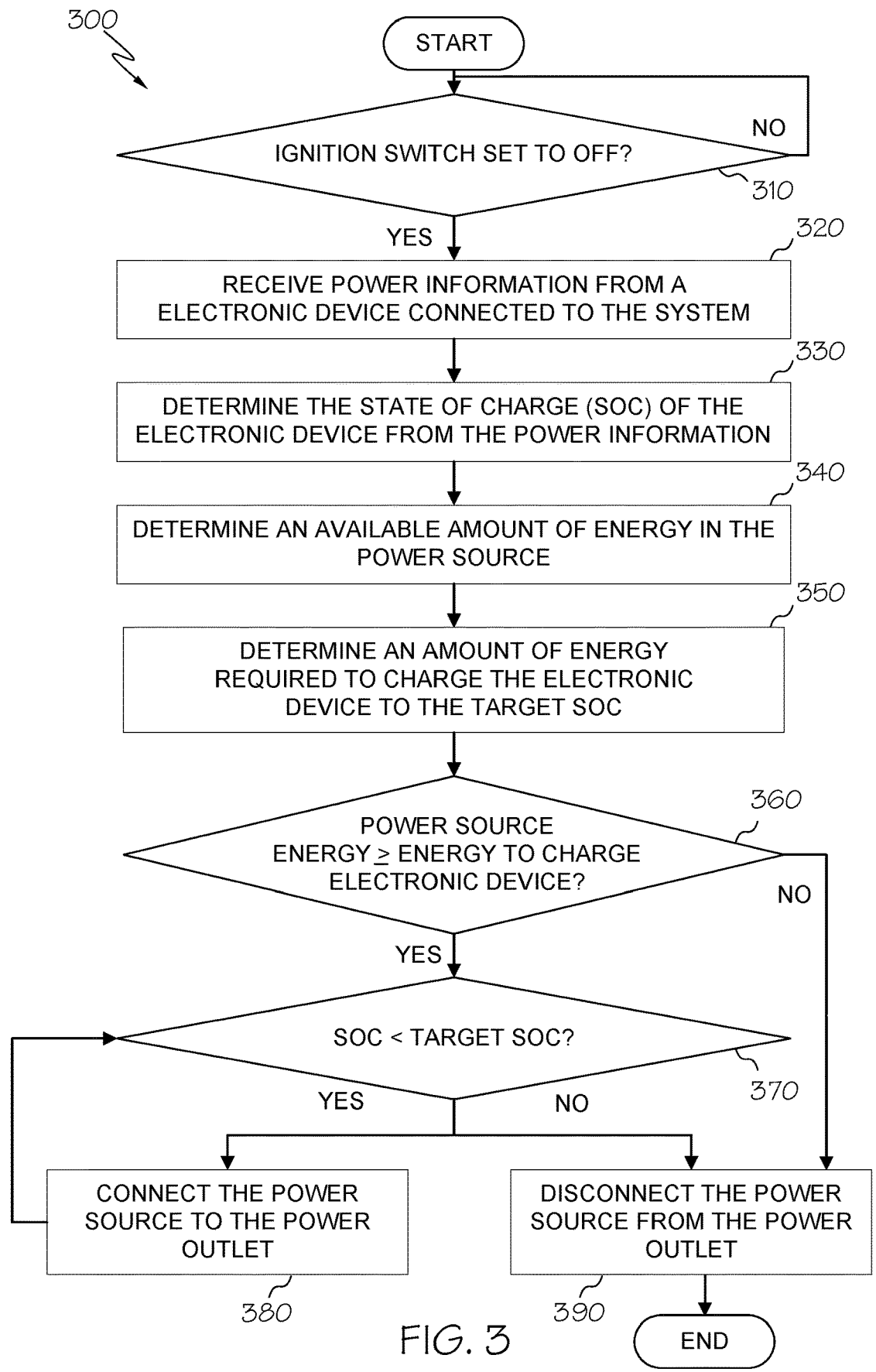
FIG. 3 depicts another illustrative method for controlling power delivered to a power outlet of a vehicle when the vehicle is in the OFF state according to one or more embodiments shown and described herein.

Referring to FIGS. 2 and 3, illustrative methods for controlling power delivered to a power outlet 146 of a vehicle 110 when the vehicle 110 is in the OFF state are depicted in flow diagrams 200 and 300. Referring to FIG. 2, a first illustrative method for controlling power delivered to a power outlet 146 of a vehicle 110 when the vehicle 110 is in the OFF state is depicted. In some embodiments, the electronic control unit 130 receives one or more signals from the ignition switch 140 indicating the state of the ignition switch 140. For example, the one or more signals may indicate the switch is in an OFF state, START state, ON state, or other state. At block 210, the electronic control unit 130 determines whether the ignition switch 140 is set to OFF. If the ignition switch 140 is not set to OFF (NO, block 210), the electronic control unit 130 returns to block 210 and continues to monitor the signals from the ignition switch 140. If the ignition switch 140 is set to OFF (YES, block 210), the electronic control unit 130 determines that the vehicle is in the OFF state and proceeds to block 220. In general, when an ignition switch 140 is OFF, the power source is disconnected from auxiliary systems, such as the power outlet 146, the entertainment system, the navigation system and/or the like. However, this is not beneficial when a user desires to continue charging an electronic device 148. Accordingly, embodiments described herein provide systems and methods for controlling power delivered to a power outlet 146 of a vehicle 110 when the vehicle 110 is in the OFF state.

At block 220, the electronic control unit 130 determines an electronic device 148 is connected to the system 100 and receives power information from the electronic device 148. The power information provided to the system 100 may include a state of charge, a capacity of the battery of the electronic device, a charge profile including for example current and voltage values, an estimate on the amount of time required to charge the battery to full, and/or other power information. The electronic device 148 may be communicatively coupled to the electronic control unit 130 via wireless means or wired means. The communicative coupling to the electronic control unit 130 may be different than the means used to connect to the power outlet for receiving power.

At block 230, the electronic control unit 130 determines a state of charge of the electronic device 148 based on the power information received from the electronic device 148. The state of charge indicates the amount of charge in a battery or other energy storage device of the electronic device 148. At block 240, the electronic control unit 130 compares the state of charge with a target state of charge stored in the non-transitory computer readable memory 134 of the electronic control unit 130. If the state of charge of the electronic device 148 is below a target state of charge (YES, block 240), then, at block 250, the electronic control unit 130 causes the electronic switch 144 to electrically connect the power source 142 to the power outlet 146 such that the power source 142 provides power to the power outlet 146.

Accordingly, charging power is provided to the electronic device 148 electrically coupled to the power outlet 146. The electronic control unit 130, while power is provided to the power outlet 146, may continually, or from time to time, receive power information from the electronic device 148 to determine when the state of charge of the electronic device 148 meets or exceeds a target state of charge.

If, or when, at block 240, the electronic control unit 130 determines that the power information indicates the state of charge of the electronic device 148 is greater than or equal to the target state of charge (NO, block 240), then, at block 260, the electronic control unit 130 causes the electronic switch to electrically disconnect the power source 142 from the power outlet 146 such that the power source 142 does not provide power to the power outlet 146. When charging is complete, the power source 142 may be disconnected from the power outlet 146 to avoid powering the power outlet 146 when it is not needed or desired by a user. In some embodiments, the power provided to the power outlet 146 from the power source 142 is terminated after a predetermined amount of time to prevent overcharging of the electronic device 148 or draining the power source 142 too much (e.g., where the power source 142 does not have sufficient power to start the vehicle engine).

In some embodiments, the target state of charge may be set by a user providing the desired state of charge level to charge their electronic device 148 to the system. In such an embodiment, the electronic control unit 130 may receive, from the electronic device, a state of charge value indicating a target state of charge value to charge the electronic device 148 to and update the target state of charge to the target state of charge value.

Turning to FIG. 3, another illustrative method for controlling power delivered to a power outlet 146 of a vehicle 110 when the vehicle 110 is in the OFF state is depicted. Blocks 310, 320, 330 of flow diagram 300 are the same as blocks 210, 220, 230 of flow diagram 200, respectively. As such, these blocks will not be described again. Once the state of charge of the electronic device is determined at block 330, the method proceeds to block 340, where the electronic control unit 130 determines an available amount of energy in the power source 142. That is, the method described in flow diagram 300 considers whether the power source 142 of the vehicle 110 (e.g., the vehicle battery) has sufficient charge to provide power to the power outlet 146 while the ignition switch 140 is in the OFF state. Conversely, this is not generally a concern when the ignition switch 140 is in the ON state because the engine of the vehicle 110 is running and providing charge to the vehicle battery.

At block 350, the electronic control unit 130 determines an amount of energy required to charge the electronic device 148 to the target state of charge based on the power information. For example, if the electronic device 148 has a 1000 mAh capacity battery that is 50% full and can be charged at a 1C rate, then it may be determined that about 30 to 40 minutes of charge time would be required to reach 100% state of charge, depending on charge efficiency, current usage current and the like. In other terms, a calculable amount of energy, at least 500 mAh when referring to the above example, would need to be delivered for charging the battery to 100%. In some instances, it may not be desirous to permit the power source 142 to power the power outlet 146 if the power source 142 is below a predetermine amount of energy. For example, when the amount of energy available in the power source 142 is less than the amount of energy required to charge the electronic device, connecting the power source 142 to the power outlet 146 when the ignition switch 140 is OFF may not be permitted. In some instances, the amount of energy available in the power source 142 is reduced by a percentage before determining if there is sufficient energy in the power source 142 such that the power source 142 is not depleted when powering the electronic device 148 via the power outlet 146 while the ignition switch 140 is set to OFF.

At block 360, the electronic control unit 130 compares the available amount of energy in the power source 142 and the amount of energy required to charge the electronic device 148 to the target state of charge to determine if the available amount of energy in the power source 142 is equal to or greater than the amount of energy required to charge the electronic device 148 to the target state of charge. In response to determining the power source 142 contains sufficient energy to charge the electronic device 148 to the target state of charge (YES, block 360) and further satisfying block 370, which corresponds to block 240 previously described with respect to FIG. 2, the electronic control unit 130 causes the electronic switch 144 to electrically connect the power source 142 to the power outlet 146 such that the power source 142 provides power to the power outlet 146, at block 380, which is the same as block 250 previously described.

In response to determining the power source 142 does not contain sufficient energy to charge the electronic device 148 to the target state of charge (NO, block 360), the method proceeds to block 390 (which is the same as block 260 described above), where the electronic control unit 130 causes the electronic switch 144 to electrically disconnect the power source 142 from the power outlet 146, if connected, such that the power source 142 does not provide power to the power outlet 146. That is, charging of the electronic device 148 is not permitted while the ignition switch 140 is OFF and the power source 142 does not have sufficient charge to enable charging of the electronic device 148.

The functional blocks and/or flowchart elements described herein may be translated onto machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

It should now be understood that embodiments described herein are directed to systems and methods for controlling power delivered to a power outlet in a vehicle when the ignition switch is OFF. Embodiments include a system that interfaces with an electronic device to be charged to determine how long a vehicle power outlet (also referred to herein as a charging port) should stay active after the vehicle ignition is switched OFF. The interface enables a vehicle to exchange information with a device to be charged. The information may include a remaining required charge time to charge the device, a desired charge level the device should achieve, a current state of charge of the device or the like so that the system may determine how long to keep the power outlet active and/or when to terminate power to the power outlet after the vehicle ignition is switched OFF.

For example, the systems and methods may include an ignition switch, a power source, a power outlet selectively coupled to the power source via an electronic switch such that when the power outlet is electrically coupled to the power source, the power source provides power to the power outlet, an electronic device removably coupled to the power outlet and an electronic control unit communicatively coupled to the ignition switch, the electronic switch and the electronic device. The electronic control unit is configured to determine that the ignition switch is set in an OFF state, receive power information from the electronic device when the ignition switch is set to the OFF state, determine, from the power information, a state of charge of the electronic device is below a target state of charge, cause the electronic switch to electrically connect the power source to the power outlet such that the power source provides power to the power outlet, and cause the electronic switch to electrically disconnect the power source from the power outlet such that the power source does not provide power to the power outlet when the power information indicates the state of charge of the electronic device is greater than or equal to the target state of charge.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
an ignition switch;
a power source;
a power outlet; and
an electronic control unit communicatively coupled to the ignition switch and configured to:
determine that the ignition switch is set to an OFF state;
determine whether a state of charge of an electronic device coupled to the power outlet is below a target state of charge;
determine an available amount of energy in the power source;
determine an amount of energy required to charge the electronic device to the target state of charge; and
in response to determining that the ignition switch is set to the OFF state and determining that the state of charge is below the target state of charge, and when the available amount of energy in the power source is equal to or greater than the amount of energy required to charge the electronic device to the target state of charge, provide power to the electronic device, until the state of charge of the electronic device reaches the target state of charge, and
when the available amount of energy in the power source is less than the amount of energy required to charge the electronic device to the target state of charge, electrically disconnect the power source from the power outlet.

2. The system of claim 1, further comprising:
an electronic switch configured to selectively couple the power outlet to the power source such that when the power outlet is electrically coupled to the power source, the power source provides power to the power outlet, wherein the electronic control unit is configured to, while the ignition switch is set to the OFF state, control the electronic switch to provide the power to the electronic device, from the power source and through the power outlet, until the state of charge of the electronic device reaches the target state of charge.

3. The system of claim 1, wherein the electronic control unit is further configured to:
receive power information from the electronic device when the ignition switch is set to the OFF state; and
determine, from the power information, the state of charge of the electronic device.

4. The system of claim 1, wherein the electronic control unit is further configured to:
receive, from the electronic device, a state of charge value indicating a target state of charge value to charge the electronic device to; and
determine the target state of charge based on the target state of charge value.

5. The system of claim 1, wherein the available amount of energy in the power source is reduced by a percentage such that the power source is not depleted when powering the power outlet while the ignition switch is set to OFF.

6. The system of claim 1, wherein the power source is a vehicle battery.

7. The system of claim 1, wherein the power outlet is a wired charging port.

8. The system of claim 1, wherein the power outlet is configured as a wireless charger, such that, when the power from the power source is provided to the power outlet, the power outlet transmits power in the form of wireless energy for charging the electronic device.

9. A method comprising:
determining that an ignition switch is set to an OFF state;
determining whether a state of charge of an electronic device coupled to a power outlet is below a target state of charge;
determining an available amount of energy in a power source;
determining an amount of energy required to charge the electronic device to the target state of charge; and
in response to determining that the ignition switch is set to the OFF state and determining that the state of charge is below the target state of charge and when the available amount of energy in the power source is equal to or greater than the amount of energy required to charge the electronic device to the target state of charge, providing power to the electronic device, until the state of charge of the electronic device reaches the target state of charge, and
when the available amount of energy in the power source is less than the amount of energy required to charge the electronic device to the target state of charge, electrically disconnecting the power source from the power outlet.

10. The method of claim 9, further comprising:
receiving power information from the electronic device when the ignition switch is set to the OFF state; and
determining, from the power information, the state of charge of the electronic device.

11. The method of claim 9, further comprising:
receiving, from the electronic device, a state of charge value indicating a target state of charge value to charge the electronic device to; and
determining the target state of charge based on the target state of charge value.

12. The method of claim 9, wherein the available amount of energy in the power source is reduced by a percentage such that the power source is not depleted when powering the power outlet while the ignition switch is set to OFF.

13. The method of claim 9, wherein the power source is a vehicle battery.

14. The method of claim 9, wherein the power outlet is a wired charging port.

15. The method of claim 9, wherein the power outlet is configured as a wireless charger such that when the power from the power source is provided to the power outlet the power outlet transmit power in the form of wireless energy for charging the electronic device.

\* \* \* \* \*